United States Patent Office 3,097,176
Patented July 9, 1963

3,097,176
PREPARATION OF ELASTOMERIC CELLULAR POLYURETHANE
Newell R. Bender, Cuyahoga Falls, and Theodore R. Ten Broeck, Hudson, Ohio, assignors to The Goodyear Tire & Rubber Company, Akron, Ohio, a corporation of Ohio
No Drawing. Filed Jan. 22, 1957, Ser. No. 635,093
4 Claims. (Cl. 260—2.5)

This invention relates to the preparation of flexible elastomeric cellular materials. More particularly, it relates to methods for preparing flexible elastomeric cellular structures from liquid reaction mixtures containing polyisocyanates and active-hydrogen-containing polymeric materials.

The production of flexible elastomeric cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. The polymeric materials contain active hydrogen atoms which react with the isocyanate groups. The polyisocyanate reactant performs a three-fold function in the reaction mixture. It operates to chain-extend the polymeric material, to react with water to generate carbon dioxide gas, and to cross-link or cure the polymeric material. The liberated carbon dioxide causes the liquid reaction mixture to expand and foam with the resultant formation of a flexible cellular structure.

This three-fold function of the polyisocyanate in the reaction and the exothermic nature of some of the reactions involved have given rise to certain problems in the production of the flexible elastomeric cellular structures and to certain undesired properties in the finished product.

The reaction mixture itself is a liquid which, as the chain extension and curing reactions proceed, changes progressively into a more viscous liquid and finally into a cured resilient cellular solid. If the generation of the carbon dioxide is set off early in the overall reaction, the mixture is not sufficiently viscous and lacks the necessary internal strength to prevent the generated gas from rising to the surface and escaping. Sometimes this causes a partial collapse of the foamed reaction mixture resulting in a cured material which has a varying density and a relatively thick skin on its surface. Other times, this premature generation of gas causes a collapse of the foamed mixture resulting in a material more solid than cellular. If, on the other hand, the gas is generated late in the course of the reaction, the elastic expansion of the mass is hindered with the result that the late-evolved gas diffuses through the mass creating foams of high density. Also the late-evolved gas tends to cause internal or surface rupturing of the foam to produce undesirable internal or surface fissures in the product.

The active-hydrogen-containing polymeric materials used to prepare the flexible elastomeric cellular materials include polyesters prepared from dibasic carboxylic acids and glycols and the polyethers containing terminal hydroxyl groups which are prepared from glycols or alkylene oxides such as ethylene oxide, propylene oxide or butylene oxide or mixtures of these oxides.

Various methods for preparing cellular materials have been described including the preparation of prepolymers of the active-hydrogen-containing polymeric material and the polyisocyanate and the subsequent mixing of the prepolymer with more polyisocyanate, water, emulsifiers and activators. It has been generally observed that the best method for producing cellular materials from any particular active-hydrogen-containing polymeric material is not always applicable to the production of cellular materials from other polymeric materials.

It is the broad object of this invention to provide methods for preparing flexible elastomeric cellular products from polypropylene ether glycol. Another object is to provide for the preparation of flexible elastomeric cellular products from polypropylene ether glycol, which products have good physical properties even when exposed to aging at high humidity and high temperature. Other objects will appear as the description proceeds.

The active-hydrogen-containing polymeric materials employed in the practice of this invention are polypropylene ether glycols having an average molecular weight of from approximately 1500 to 3200. These glycols may be represented by the formula $$\mathrm{HO-(C_3H_6-O)_n-H}$$

in which $n$ is a whole number ranging from approximately 26 to 55. To achieve the objects of this invention the polypropylene ether glycol is heated with from 3.0 to 6.0 mols of polyisocyanate per mol of glycol to form a prepolymer having a room temperature viscosity of from 2,000 to 50,000 centipoises as measured by the Brookfield viscometer. The prepolymer has an isocyanate content, a term which will be discussed at length below, of from 4% to 15% depending upon the amount of polyisocyanate employed to prepare the prepolymer and the extent to which the polyisocyanate has reacted with the polypropylene ether glycol in the formation of the prepolymer. To complete the manufacture of the flexible elastomeric cellular material, the prepolymer is first mixed with water, an activator, controlled amounts of an emulsifier and, if desired, additional polyisocyanate. Then, after mixing, the reaction mixture is poured into a mold or onto a casting surface where it foams and cures.

The polypropylene ether glycols employed in the practice of this invention may be prepared by the condensation of propylene oxide with a base compound having a plurality of reactive hydrogen atoms such as propylene glycol. Methods for preparing the polypropylene ether glycols are described in United States Patent 2,674,619.

Any polyisocyanate such as a diisocyanate, a triisocyanate or higher functional polyisocyanates or mixtures of these may be employed to prepare the flexible elastomeric cellular products. Diisocyanates are preferred and the liquid diisocyanates such as 2,4-tolylene diisocyanate or 2,6-tolylene diisocyanate or mixtures of these are most preferred. Other polyisocyanates which may be used are para-phenylene diisocyanate, 1,5 naphthalene diisocyanate and 4,4' diphenylene methane diisocyanate. The amount of polyisocyanate employed, as indicated above, is between 3.0 to 6.0 mols per mol of glycol. The smaller amounts of polyisocyanate yield prepolymers which contain less unreacted isocyanate and which produce higher density foams, because of the smaller amounts of carbon dioxide generated in the reaction between the unreacted isocyanate and the water later added. After the prepolymer has been prepared and upon determination of the unreacted isocyanate content of the prepolymer, additional polyisocyanate may be added to the prepolymer if finished products of lower density are desired.

The isocyanate content of the prepolymer is determined by dissolving a 5 to 10 gram sample of the prepolymer in 25 milliliters of dry toluene to which is added 20 milliliters of an approximately 2 normal dibutyl amine solution in toluene prepared by dissolving 304.2 milliliters of dibutyl amine in 595.8 milliliters of dry toluene. The solution is warmed slowly to incipient boiling after which it is permitted to cool for 1 hour. This solution is then diluted with 100 milliliters of methyl alcohol. The excess dibutyl amine is titrated with approximately 1 normal aqueous hydrogen chloride using 10 drops of bromphenol blue as an indicator. A blank sample containing no prepolymer is run in the same manner. The isocyanate content by percent is calculated from the following equation:

$$\text{Percent isocyanate} = \frac{(M_1 - M_2) \times N \times 42 \times 100}{\text{wt. of sample} \times 1000}$$

where:

$M1$ = milliliters of standard HCl required for the blank
$M2$ = milliliters of standard HCl required for the sample
$N$ = the normality of the hydrochloric acid
42 represents the molecular weight of —NCO The time and temperature employed to prepare the prepolymer is not critical in the practice of this invention so long as the mixture is heated at a high enough temperature and for a sufficient time to yield a prepolymer having a viscosity of from 2,000 to 50,000 centipoises and preferably from 3,000 to 10,000 centipoises. Times of from 15 minutes to 2 hours and temperatures of from 80° C. to 140° C. have been successfully employed to prepare the prepolymer.

The emulsifier added to the prepolymer in accordance with the practice of this invention is a silicone oil whose function is to prevent the collapse of the foamed reaction mixture before it cures and to yield finished products which have a finer pore structure. The silicone oils employed are linear polymers of the type represented by the general formula:

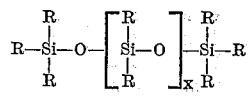

in which R is an organic radical of relatively low molecular weight such as methyl or ethyl and X is an integer representing the number of units in the molecular chain. These oils are clear liquids which can be obtained in a wide range of viscosities as determined by the length of the polymer chain. The silicone oils have viscosities ranging from 10 to 1,000 centistokes measured at 25° C. A particularly effective type of silicone oil employed in the practice of this invention is one sold by Dow Corning as DC200–10. Other silicone oils are marketed by General Electric and Linde Air Products. The amount of silicone oil employed as emulsifier should be between 0.25 and 1.5 parts by weight based upon 100 parts by weight of the prepolymer. Since the density of the finished cellular material depends upon the amount of carbon dioxide generated during the reaction and since the amount of carbon dioxide generated depends upon the water content and isocyanate content of the reaction mixture, densities can be controlled by regulating the amounts of water and free isocyanate present in the complete reaction mixture. It has been found, for instance, that an isocyanate content of 13% when reacted with 120% of the theoretical amount of water will yield finished products having a density of approximately 1.4 pounds per cubic foot while isocyanate contents as low as 4% when similarly reacted will yield finished products having a density of approximately 10 pounds per cubic foot.

The amount of water added to the prepolymer may be varied within comparatively wide limits depending upon the amount of free unreacted isocyanate in the prepolymer and the density desired in the finished product. Of the theoretical amount of water required to react with the free isocyanate, the use of as little as 85% and as much as 200% of that amount has been found to produce satisfactory elastomeric cellular products. In terms of amounts based upon 100 parts by weight of prepolymer, the water may vary from as little as 0.7 part by weight for 85% of theory for a prepolymer containing 4% free isocyanate content to as much as 6.5 parts by weight for 200% of theory for a prepolymer containing 15% free isocyanate content. It has been found that to obtain optimum results, the amount of water added to the prepolymer should be based upon from 0.1 to 10% less on a mol basis than the difference between the mols of diisocyanate employed in preparing the prepolymer (plus any amount of diisocyanate later added) and the mols of glycol in the prepolymer. In other words, by subtracting the mols of glycol from the total mols of diisocyanate employed and by multiplying the difference by from 90% to 99.9%, the result gives the mols of water to be added for optimum results.

The activators employed in preparing the cellular reaction products are alkaline materials. Specific activators which have been found to be effective are the tertiary amines, or mixtures thereof, such as N-methyl morpholine, N-ethyl morpholine, triethylamine and the aldehyde/amine condensation products such as those described in United States Patents 1,780,326 and 1,780,334. Particularly effective activators are those which are relatively volatile and which will evaporate from the finished product which should preferably not possess a low pH, it having been observed that a low pH in the finished product accelerates degradation of the product under conditions of high humidity. The amount of activator found to be useful in the practice of this invention is from 0.1 part to 3.0 parts by weight based upon 100 parts by weight of the prepolymer. It is preferred to use from 1 to 2 parts by weight of the activator based upon 100 parts by weight of the prepolymer.

While the practice of this invention has been particularly described with reference to polypropylene ether glycol as the basic polymer, the preparation of the prepolymer and its subsequent reaction with the emulsifier, water, and activator can be successfully applied to the manufacture of cellular products from polypropylene ether glycols which contain relatively small amounts of ethylene oxide units on the ends of the polypropylene oxide chain. These materials, examples of which are sold by the Wyandotte Chemical Company as Pluronics L–61 and L–81, have been fully described in the United States Patent 2,674,619. The oxyethylene-terminated polypropylene ether glycols which are particularly useful in preparing cellular products are those having an average molecular weight of from approximately 1500 to 2500 and those defined by the formula:

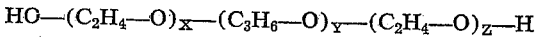

wherein Y is a whole number ranging from 20 to 42 and X and Z are whole numbers ranging from 1 to 4 and wherein the X and Z units are from 10 to 20% by weight of the compound. Mixtures of these oxyethylene-terminated polypropylene ether glycols with polypropylene ether glycols may also be used in practicing the process of this invention.

The practice of this invention is further illustrated by the following examples which are illustrative rather than restrictive of the scope of the invention. Unless otherwise indicated parts are shown by weight.

EXAMPLE 1

Into a clean, dry reaction vessel which had been filled with dry nitrogen was placed 100 parts of polypropylene ether glycol having an average molecular weight of from 1950 to 2100. This material is sold by Carbide and Carbon Chemicals as Polypropylene Glycol 2025, having a specific gravity of 1.006, freezing range in the vicinity of −45° C., and water solubility at 20° C. of 0.15%. To this was added, under anhydrous conditions and with adequate stirring, 46.3 parts of a mixture of tolylene diisocyanates containing approximately 80% by weight of the 2,4-isomer and 20% by weight of the 2,6-isomer. Such diisocyanates are sold as Hylene TM by duPont, or Nacconate 80 by National Aniline Division of Allied Chemical and Dye Corp. Heat was applied to raise the temperature rapidly to 100° C., at which temperature the mix was held for 2 hours. Throughout the reaction the mixture was kept blanketed with dry nitrogen. At the end of the heating period the mixture was cooled to 50° C. and discharged into a clean, dry, nitrogen-filled container and tightly closed. The prepolymer formed had an isocyanate content of 8.7% and a viscosity of 7500 centipoises at 30° C.

To 146.3 parts of this prepolymer was added 1.0 part of silicone oil having a viscosity of 10 centistokes at 25° C., sold by Dow-Corning as DC200-10, and 1.5 parts of polyoxyethylated vegetable oil, an emulsifying agent sold by General Dye Stuffs as Emulphor EL-719, and the components were thoroughly blended. To this was added, with rapid agitation, a mixture of 2.77 parts of water, 1.5 parts of N-ethyl morpholine, and 0.5 part of triethylamine. After about 30 seconds the foaming mass was poured into a mold and allowed to expand and set. The expanded mass was then placed in an oven at 70° C. for 1 hour.

Another prepolymer was prepared in the manner as described in Example 1 except that, instead of the polypropylene ether glycol, polybutylene ether glycol was used. This glycol sold by E. I. Du Pont and Co. as Teracol 30 is a white waxy solid melting in the range of 33 to 37° C. and has an average molecular weight of approximately 3,000. To 100 parts of this glycol were added 35 parts by weight of tolylene diisocyanate. The prepolymer had an isocyanate content of 10.1% and a viscosity of 6800 centipoises at 30° C. This prepolymer was treated in the same manner and with the same amounts of the same materials as shown in Example 1. The foaming mass was poured into a mold within ½ minute and allowed to expand. When the foam had expanded the structure collapsed completely, resulting in a solid resinous mass.

EXAMPLE 2

Into a clean, dry reaction vessel which had been filled with dry nitrogen was placed 100 parts of the polypropylene ether glycol described in Example 1. To this was added, under anhydrous conditions and with adequate stirring, 28.5 parts of the mixture of tolylene diisocyanates described in Example 1. Heat was applied to raised the temperature rapidly to 100° C., at which temperature the mix was held for 2 hours. Throughout the reaction the mixture was kept blanketed with dry nitrogen. At the end of the heating period the mixture was cooled to 50° C. and discharged into a clean, dry, nitrogen-filled container and tightly closed. Additional tolylene diisocyanate (17.8 parts) was then added. The prepolymer formed had an isocyanate content of 10.2% and a viscosity of 4470 centipoises at 30° C.

To 146.3 parts of this prepolymer was added 1.0 part of the silicone oil described in Example 1, and 1.5 parts of the polyoxyethylated vegetable oil described in Example 1 and the components were throughly blended. To this was added, with rapid agitation, a mixture of 3.7 parts of water and 1.0 part of N-ethyl morpholine. After about 30 seconds the foaming mass was poured into a mold and allowed to expand and set. The expanded mass was then placed in an oven at 70° C. for 1 hour.

EXAMPLE 3

Into a clean, dry reaction vessel which had been filled with dry nitrogen was placed 100 parts of the polyproylene ether glycol described in Example 1. To this was added, under anhydrous conditions and with adequate stirring, 46.3 parts of the mixture of tolylene diisocyanates described in Example 1. Heat was applied to raise the temperature rapidly to 100° C., at which temperature the mix was held for 2 hours. Throughout the reaction the mixture was kept blanketed with dry nitrogen. At the end of the heating period the mixture was cooled to 50° C. and discharged into a clean, dry, nitrogen-filled container and tightly closed. The prepolymer formed had an isocyanate content of 8.9% and a viscosity of 7500 centipoises at 30° C.

To 146.3 parts of this prepolymer was added 1.0 part of the silicone oil described in Example 1, and 1.5 parts of the polyoxyethylated vegetable oil described in Example 1 and the components were thoroughly blended. To this was added, with rapid agitation, a mixture of 4.15 parts of water and 1.5 parts of N-ethyl morpholine. After about 30 seconds the foaming mass was poured into a mold and allowed to expand and set. The expanded mass was then placed in an oven at 70° C. for 1 hour.

EXAMPLE 4

Into a clean, dry reaction vessel which had been filled with dry nitrogen was placed 100 parts of the polyproylene ether glycol described in Example 1. To this was added, under anhydrous conditions and with adequate stirring, 46.3 parts or the mixture of tolylene diisocyanate described in Example 1. Heat was applied to raise the temperature rapidly to 100° C., at which temperature the mix was held for 3¾ hours. Throughout the reaction the mixture was kept blanketed with dry nitrogen. At the end of the heating period the mixture was cooled to 50° C. and discharged into a clean, dry, nitrogen-filled container and tightly closed. The prepolymer formed had an isocyanate content of 9.2% and a viscosity of 8,000 centipoises at 30° C.

To 146.3 parts of this prepolymer was added 1.0 part of the silicone oil described in Example 1, and 1.5 parts of the polyoxyethylated vegetable oil described in Example 1 and the components were thoroughly blended. To this was added, with rapid agitation, a mixture of 3.78 parts of water and 1.5 parts of N-ethyl morpholine. After about 30 seconds the foaming mass was poured into a mold and allowed to expand and set. The expanded mass was then placed in an oven at 70° C. for 1 hour.

EXAMPLE 5

Into a clean, dry reaction vessel which had been filled with dry nitrogen was placed 100 parts of the polypropylene ether glycol described in Example 1. To this was added, under anhydrous conditions and with adequate stirring 27.0 parts of the mixture of tolylene diisocyanate described in Example 1. Heat was applied to raise the temperature rapidly to 100° C., at which temperature the mix was held for 1 hour. Throughout the reaction the mixture was kept blanketed with dry nitrogen. At the end of the heating period the mixture was cooled to 50° C. and discharged into a clean, dry, nitrogen-filled container and tightly closed. Additional tolylene diisocyanate (10.0 parts) was then added. The prepolymer formed had a viscosity of 8,800 centipoises at 30° C.

To 137 parts of this prepolymer was added 1.5 parts of the silicone oil described in Example 1, and 1.5 parts of the polyoxyethylated vegetable oil described in Example 1 and the components were thoroughly blended. To this was added, with rapid agitation, a mixture of 2.7 parts of water and 1.0 part of N-methyl morpholine. After about 30 seconds the foaming mass was poured into a mold and allowed to expand and set. The expanded mass was then placed in an oven at 70° C. for 20 minutes.

EXAMPLE 6

Into a clean, dry reaction vessel which had been filled with dry nitrogen was placed 100 parts of the polypropylene ether glycol described in Example 1. To this was added, under anhydrous conditions and with adequate stirring, 37.0 parts of the mixture of tolylene diisocyanates described in Example 1. Heat was applied to raise the temperature rapidly to 100° C., at which temperature the mix was held for 2 hours. Throughout the reaction the mixture was kept blanketed with dry nitrogen. At the end of the heating period the mixture was cooled to 50° C. and discharged into a clean, dry, nitrogen-filled container and tightly closed. The prepolymer formed had a viscoity of 9,200 centipoises at 30° C.

To 137 parts of this prepolymer was added 1.0 part of the silicone oil described in Example 1, and 1.5 parts of the polyoxyethylated vegetable oil described in Example 1 and the components were thoroughly blended. To this was added, with rapid agitaion, a mixture of 2.7 parts of water and 1.0 part of N-methyl morpholine. After about 30 seconds the foaming mass was poured into a mold and allowed to expand and set. The expanded mass was then placed in an oven at 70° C. for 20 minutes.

EXAMPLE 7

Into a clean, dry reaction vessel which had been filled with dry nitrogen was placed 100 parts of the polypropylene ether glycol described in Example 1. To this was added, under anhydrous conditions and with adequate stirring, 37.0 parts of the mixture of tolylene diisocyanates described in Example 1. Heat was applied to raise the temperature rapidly to 100° C., at which temperature the mix was held for 1 hour. Throughout the reaction the mixture was kept blanketed with dry nitrogen. At the end of the heating period the mixture was cooled to 50° C. and discharged into a clean, dry, nitrogen-filled container and tightly closed. The prepolymer formed had a viscosity of 12,700 centipoises at 30° C.

To 137 parts of this prepolymer was added 1.0 part of the silicone oil described in Example 1, and 1.5 parts of the polyoxyethylated vegetable oil described in Example 1 and the components were thoroughly blended. To this was added, with rapid agitation, a mixture of 2.7 parts of water and 1.0 part of N-methyl morpholine. After about 30 seconds the foaming mass was poured into a mold and allowed to expand and set. The expanded mass was then placed in an oven at 70° C. for 1 hour.

In Table I below are reported the density in pounds per cubic foot, the tensile strength in pounds per square inch, and the elongation in percent for each of the cellular materials prepared according to Examples 1 through 7.

Table I

| Example | Density | Tensile | Elongation |
| --- | --- | --- | --- |
| 1 | 3.48 | 12.9 | 105 |
| 2 | 2.72 | 14.1 | 135 |
| 3 | 3.34 | 12.2 | 105 |
| 4 | 3.33 | 12.4 | 95 |
| 5 | 3.83 | 23.1 | 240 |
| 6 | 3.54 | 11.0 | 125 |
| 7 | 4.05 | 9.7 | 115 |

In Table II are reported the original and aged values for the compression, retention of gauge and hysteresis loss of each of the materials prepared according to Examples 1 through 7. The compresison values are reported in pounds per square inch required to compress a sample 25% and 50% of its original thickness. Compression is a measure of the softness of the cellular materials, lower values being found in the softer examples. Retention of gauge is reported in percent of original thickness to which a sample returns after being compressed 50% in an air oven at 158° F. for 22 hours. Hysteresis loss is a measure of the energy lost in the compression to 60% of its thickness and the subsequent relaxation of a test sample. The samples from each example were tested both as to original properties and as to aged properties after being subjected to 21 days aging in a 158° F. oven at a relative humidity of from 95% to 100%.

Table II

| Example | 25 percent compression | | 50 percent compression | | Retention of gauge, percent | | Hysteresis loss, percent | |
| --- | --- | --- | --- | --- | --- | --- | --- | --- |
| | Original | Aged | Original | Aged | Original | Aged | Original | Aged |
| 1 | .54 | .45 | .92 | .79 | 83.9 | 75.5 | 60.7 | 65.5 |
| 2 | .40 | .34 | .68 | .56 | 84.5 | 85.0 | 62.8 | 61.0 |
| 3 | .49 | .42 | .84 | .76 | 80.5 | 72.5 | 61.2 | 63.0 |
| 4 | .52 | .43 | .89 | .76 | 86.8 | 75.9 | 58.0 | 63.5 |
| 5 | .47 | .43 | .82 | .73 | 69.7 | 92.5 | 50.9 | 45.1 |
| 6 | .34 | .28 | .59 | .47 | 89.3 | 87.3 | 50.6 | 49.3 |
| 7 | .34 | .30 | .62 | .51 | 90.2 | 86.7 | 45.7 | 48.2 |

In place of the specific polypropylene ether glycols, diisocyanate, silicone oil, and other ingredients employed in Examples 1 through 7, other reactants and ingredients within the scope of the teaching herein may be employed in the process of this invention.

While certain representative embodiments and details have been shown for the purpose of illustrating the invention, it will be apparent to those skilled in this art that various changes and modifications may be made therein without departing from the spirit or scope of the invention.

We claim:

1. A method for preparing flexible elastomeric cellular materials which comprises heating a polypropylene ether glycol having an average molecular weight of from 1500 to 3200 with from 3.0 to 6.0 mols of an organic polyisocyanate per mol of said glycol to produce a prepolymer having a viscosity at room temperature of from 2,000 to 50,000 centipoises, adding to and mixing with 100 parts by weight of said prepolymer (A) from 0.7 to 6.5 parts by weight of water (B) from 0.1 to 3.0 parts by weight of a tertiary amine and (C) from 0.25 to 1.5 parts by weight of silicone oil and permitting the complete reaction mixture to expand and cure, said silicone oil being defined by the formula

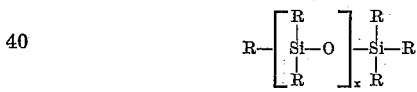

in which R is selected from the group consisting of methyl and ethyl and x is an integer representing the number of units in the molecular chain, said silicone oil having a viscosity of from 10 to 1,000 centistokes as measured at 25° C.

2. A method for preparing flexible elastomeric cellular materials which comprises heating a polypropylene ether glycol having an average molecular weight of from 1500 to 3200 with from 3.0 to 6.0 mols of an organic polyisocyanate per mol of said glycol to produce a prepolymer having a viscosity at room temperature of from 2,000 to 50,000 centipoises, adding to and mixing with 100 parts by weight of said prepolymer (A) from 0.7 to 6.5 parts of water by weight (B) from 0.1 to 3.0 parts by weight of a tertiary amine (C) an organic polyisocyanate and (D) from 0.25 to 1.5 parts by weight of silicone oil and permitting the complete reaction mixture to expand and cure, said silicone oil being defined by the formula:

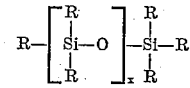

in which R is selected from the group consisting of methyl and ethyl and x is an integer representing the number of units in the molecular chain, said silicone oil having a viscosity of from 10 to 1,000 centistokes as measured at 25° C.

3. A method according to claim 1 in which the polyisocyanate is tolylene diisocyanate.

4. The method according to claim 2 in which the polyisocyanate is tolylene diisocyanate.

(References on following page)

References Cited in the file of this patent

UNITED STATES PATENTS

| | | |
|---|---|---|
| 2,764,565 | Hoppe et al. | Sept. 25, 1956 |
| 2,993,013 | Wolfe | July 18, 1961 |

FOREIGN PATENTS

| | | |
|---|---|---|
| 167,675 | Australia | May 14, 1956 |

OTHER REFERENCES

Hopkins: "Rubber Age," volume 78, No. 2, November 1955, pages 239 to 248.

"The Condensed Chemical Dictionary," 5th edition, Reinhold Publishing Company, copyright 1956, page 411.

Patterson: "American Ink Maker," volume 26, pages 26 to 28, 55 and 57, April 1948.